(No Model.)
T. B. JEFFERY.
VELOCIPEDE.
No. 365,074. Patented June 21, 1887.
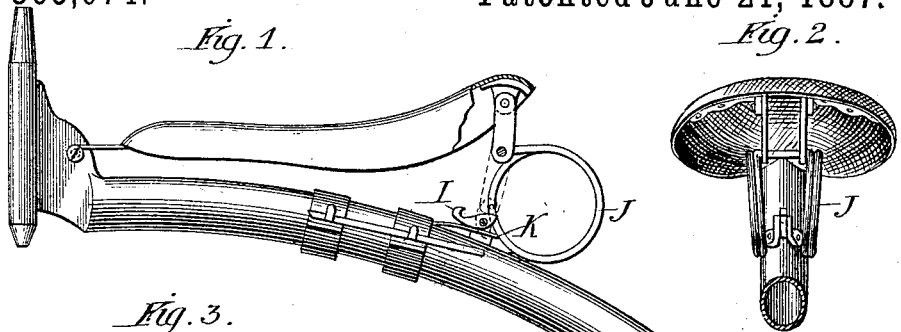
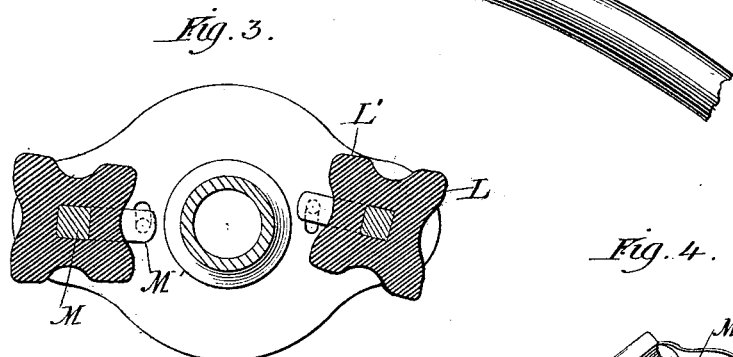
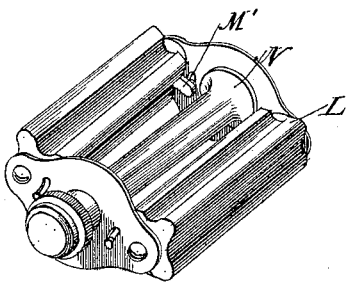
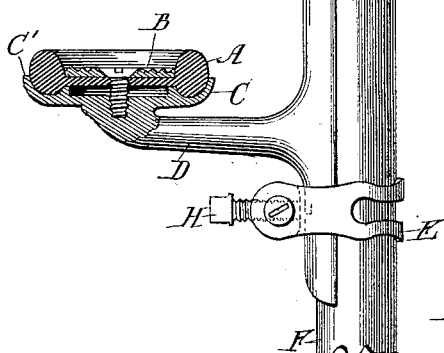
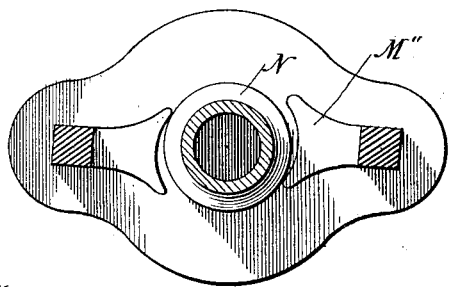
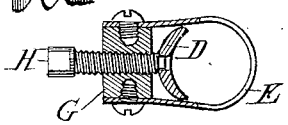
Witnesses:
Frank J. Blanchard
R. Philip Gormully
Inventor:
Thos. B. Jeffery
N. PETERS, Photo-Lithographer, Washington, D. C.

UNITED STATES PATENT OFFICE.

THOMAS B. JEFFERY, OF RAVENSWOOD, ILLINOIS.

VELOCIPEDE.

SPECIFICATION forming part of Letters Patent No. 365,074, dated June 21, 1887.

Application filed January 11, 1886. Serial No. 188,211. (No model.)

*To all whom it may concern:*

Be it known that I, THOMAS B. JEFFERY, a citizen of the United States, residing at Ravenswood, in the county of Cook and State of Illinois, have invented certain new and useful Improvements in Velocipedes, of which the following is a specification.

My invention is designed to make the operation of mounting and riding the velocipede safer and easier; and it consists in the means employed for preventing the foot slipping from both the pedal and step and the means used for allowing the seat to be easier reached.

The invention is described in the following specification, reference being had to the accompanying drawings, in which—

Figure 1 represents a side view of the seat; Fig. 2, an end view of the same; Figs. 3 and 6, sections of the pedal; Fig. 4, a perspective view of the same; Fig. 5, a side view of the step, partly in section; Fig. 7, a horizontal view of the same in section.

To prevent the foot slipping from the step, I use a rubber pad, A, Fig. 5, having a thickened edge and hollowed center, that the weight of the user may be as largely distributed as possible, and in the hollowed center I secure a roughened plate of metal, B. This roughened plate and rubber pad form to the foot of the rider a strongly-adhesive support. The rubber rests on a metal base, C, provided with slightly-upturned edges C', which supports the rubber and prevents its spreading too much under the weight of the operator. Extending sidewise from the base is the bracket D, made to lie against the backbone. To clamp the same thereto, I use a band, E, embracing part of the backbone F. This is a metal band bent in a U-shaped form, having between its parallel ends a nut, G, and an impinging-screw, H, the latter arranged to press upon that portion of the bracket which is in contact with the backbone and secure both parts together.

To allow of the seat being easily reached from the step, I provide means for compressing and holding the spring down until the rider is seated. This is shown in the drawings at Figs. 1 and 2, and consists of a dog or hook, I, placed on either the saddle or backbone, and capable of being placed in position to retain or release its hold when required. In the construction shown the dog I is pivoted to the backbone in the released position. Above the dog is shown the saddle, to which is attached a depending link. This link connects the coiled spring J to the saddle. Between the two extremities of the link the dog I is arranged to be attached when the spring J is depressed, the hook at the end of the dog being so shaped that it will resist a pull in an upward direction. Under the dog is another spring, K, operating to remove the hook of the dog from its hold. The upward pressure of the spring J being, however, greater than that of the spring K, no detachment occurs until the weight of the rider comes on the saddle, and by depressing the large spring the small one, K, is able to act and move the hook away from its locking or engaging position.

In operation, while the user is dismounted he connects the dog by depressing the spring J and elevating the hook until they become locked together. Then with one foot on the step the saddle is easily reached. The weight of the rider on the seat overcomes somewhat the upward pressure of the spring J, allowing the smaller spring to act, and, releasing the catch, it moves into position shown at Fig. 1. It is evident that the dog or catch may be secured to the spring or saddle as well as the backbone and operate in a similar manner; but the arrangement shown operates quite satisfactory.

In constructing the pedals I employ foot-blocks, formed somewhat as shown at L, Figs. 3 and 4, of rubber, cork, or other suitable material, but differing from those in ordinary use in having the faces on which the feet rest and which are on both sides of the pedal inclined to each other. Thus the portion L' nearest the wrist-pin or pedal-pin is narrower or thinner than the part L, removed from the pedal-pin.

The object and the form will be better understood by observing that the under side of a shoe or boot where it bears on the pedal is considerably curved or rounded, and can only properly fit and adhere well to a surface that conforms to it, which will be low near the center and high at the edges; and to adapt the blocks to shoes of different curvatures the blocks are supported on pivots which oscillate slightly within certain limits, the limitation being made to prevent the foot turning or rolling them completely over if pressed horizontally forward in use. The means for limiting the motion are shown in the drawings, as at Fig. 3, where the central angular bar, M, which forms the core of the foot-block, is formed with a projection, M', containing a stud, which passes into a slot in the pedal side. In Fig. 6 the projection M" is widened and formed to abut against any projecting part of the pedal, as its central tube, N.

The foot-blocks described need not be grooved or fluted, as shown. They may be of any form giving a large adhering surface. The form shown, however, adapts itself well to the foot, is light in weight, and neat in appearance.

I claim as my invention—

1. In a velocipede-step, a rubber pad having a depressed center and thickened or raised edges, in combination with a metal base having upturned edges, by which it is supported, and clamped to the frame of a velocipede by a band encircling it, substantially as and for the purpose described.

2. A velocipede-step having a hollowed rubber plate, roughened metal center, and a metal base provided with upturned outer edges, substantially as and for the purpose described.

3. In a velocipede-pedal having foot-blocks secured therein and arranged with their outer edges higher than the portion near the wrist-pin, a central angular metallic bar controlling its position, as described, substantially as set forth.

4. The combination of the velocipede seat, spring, and backbone with a detaining-catch, operating as described, for the purpose set forth.

5. The velocipede-seat having an upward-pressing spring, a detaining-dog interposed between the seat and backbone, and a catch on which it acts, secured to the backbone or spring, as set forth, for the purpose described.

6. In combination with a velocipede-seat, backbone, compressed and detained spring, the dog or its equivalent, substantially as described.

7. In combination with a velocipede-pedal block having the faces on which the foot bears inclined toward each other, a central angular bar provided with a projection engaging with a fixed stop in the pedal-frame to limit its movement, substantially as set forth.

THOS. B. JEFFERY.

Witnesses:
R. PHILIP GRUMELLY,
CHAS. S. NEEROS.